United States Patent [19]

Ohno et al.

[11] Patent Number: 4,842,917

[45] Date of Patent: Jun. 27, 1989

[54] MAGNETIC RECORDING MEDIUM AND PROCESS FOR PRODUCING THE SAME

[75] Inventors: Tomoyuki Ohno, Kokubunji; Yoshihiro Shiroishi, Hachioji; Sadao Hishiyama, Sayama; Hiroyuki Suzuki, Kawasaki; Takaaki Shirakura, Chigasaki; Shinya Matsuoka, Odawara; Makoto Sano, Kanagawa; Takao Nakamura, Yokohama; Kazumasa Takagi, Tokyo; Tokuumi Fukazawa, Tachikawa; Kenzo Susa, Tokyo, all of Japan

[73] Assignee: Hitachi, Ltd., Tokyo, Japan

[21] Appl. No.: 88,380

[22] Filed: Aug. 24, 1987

[30] Foreign Application Priority Data

Sep. 1, 1986 [JP] Japan ................................ 61-203610
Sep. 1, 1986 [JP] Japan ................................ 61-203609

[51] Int. Cl.$^4$ ............................................. G11B 5/64
[52] U.S. Cl. ................................. 428/141; 204/192.2; 427/131; 427/132; 428/694; 428/900
[58] Field of Search ................ 428/141, 694, 900; 427/38, 48, 50, 131, 132; 204/192.11, 192.12, 192.2

[56] References Cited

U.S. PATENT DOCUMENTS

| | | | |
|---|---|---|---|
| 3,520,664 | 7/1970 | York | 427/131 |
| 4,411,963 | 10/1983 | Aine | 427/132 |
| 4,567,116 | 1/1986 | Sawada et al. | 427/132 |
| 4,642,270 | 2/1987 | Morita et al. | 427/132 |
| 4,745,005 | 5/1988 | Sugita et al. | 427/132 |

Primary Examiner—Paul J. Thibodeau
Attorney, Agent, or Firm—Antonelli, Terry & Wands

[57] ABSTRACT

A magnetic recording medium having a magnetic film formed on a substrate directly or through an underlayer from an alloy containing Co as a principal component. The central line average surface roughness Ra and maximum surface roughness Rmax of the magnetic film in a direction perpendicular to the direction of magnetic recording are selected so as to fall within the ranges of $1\text{ nm} \leq Ra \leq 20\text{ nm}$ and $Rmax \leq 25\ Ra$, respectively, and the in-plane magnetic anisotropy energy Ku of the magnetic film is selected to fall within the range of $0 \leq Ku \leq 8 \times 10^5\text{ erg/cm}^3$. Thus, it is possible to minimize the value of modulation which represents the degree of variation of read output on the same circumference of a magnetic disk. It is also possible to reduce the noise generated in read and write operations by forming the magnetic film so as have no crystallographic orientation.

30 Claims, 5 Drawing Sheets

MAGNETIC RECORDING MEDIUM AND PROCESS FOR PRODUCING THE SAME

BACKGROUND OF THE INVENTION

1. Field of the Invention

The present invention relates to a magnetic recording medium for use in, for example, a magnetic disk system. More particularly, the present invention pertains to a magnetic recording medium which employs a ferromagnetic metallic film as a recording layer and which has excellent corrosion resistance, a small value of modulation that represents the degree of low frequency variation of read output, a lowered level of noise generated during read and write operations, improved durability, excellent magnetic properties and high reliability and is therefore suitable for high density recording. The invention is also concerned with a process for producing the abovedescribed magnetic recording medium.

2. Description of the Prior Art

Conventional magnetic recording media which employ as recording layers ferromagnetic metallic films formed by means of evaporation, sputtering, ion plating or various other deposition methods have excellent magnetic properties suitable for high density recording but, at the same time, suffer from the following disadvantage. Since the magnetic layer is constituted by a metallic film, it is readily corroded and the magnetic properties are thus degraded with time, which means that this type of magnetic recording medium has inferior durability and reliability. In order to overcome this disadvantage, a multilayered magnetic recording medium has been proposed in Japanese Patent Publication No. 33523/1979. In this magnetic recording medium, a thin film which is formed from a metal such as Cr, Ti, Mn or V or an oxide thereof is provided as an underlayer (intermediate layer) or an overcoat for a ferromagnetic metallic film in order to improve the corrosion resistance. As another solution, a method wherein 2 to 15% by weight of Cr which is a third element is added to a magnetic thin film of Co or Co—Ni alloy in order to improve the magnetic properties and durability is described in Japanese Patent Laid-Open No. 15406/1982. In these conventional magnetic recording media, corrosion resistance is substantially improved, but the improvement in magnetic properties is still insufficient. Accordingly, they are required for magnetic recording media for high density inferior in terms of performance and reliability which are recording. Recently, a magnetic recording medium which has less lowering in read and write efficiency, reduced friction and no fear of the surface being shaved and which is excellent in both traveling performance and durability has been proposed (see Japanese Patent Laid-Open No. 223025/1985) in which a topcoat (lubricant layer) which contains a lubricant, an oxidation inhibitor, an organic binder, etc. is formed on a ferromagnetic metallic film by means of coating, and the surface roughness (Rmax) of the topcoat is adjusted so as to fall within the range from 20 to 200 Å. However, this prior art mainly relates to magnetic recording tapes, and the topcoat layer serving as a lubricant layer is provided mainly for the purpose of reducing the friction occurring at the surface of the magnetic tape to thereby improve the traveling stability.

As described above, efforts have been made to improve the durability and magnetic properties of conventional magnetic recording media which employ ferromagnetic metallic films as magnetic recording layers: namely, provision of an underlayer (intermediate layer) or an overcoat (protective layer) on a magnetic film; addition of a third element such as Cr to a magnetic film; and formation of a lubricant layer having a specific surface roughness for the purpose of minimizing friction and thereby improving the traveling stability. However, many of these proposed magnetic recording media are intended to be used mainly in the audio, video or digital recording field. Therefore, although the corrosion resistance and durability are substantially improved, the magnetic properties are still insufficient to satisfy stringent specifications for magnetic recording media used for high density recording in which higher magnetic properties, durability and reliability are required, for example, hard disks for computers. Read and write characteristics of magnetic recording media include so-called modulation (modulation of read-signal envelope) which is a value represented by a parameter [(Emax−Emin)/(Emax+Emin)] which is determined by a maximum output value Emax and a minimum output value Emin of a read-signal envelope curve on the same circumference in read and write operations of a magnetic disk. It is known that the value of modulation has a considerable effect on read and write errors, and it is therefore strongly desired to lower the value of modulation.

As one example of ferromagnetic metallic films, a thin film which contains Co as a principal component and 20 to 30 at (atom) % of nickel (Ni) is employed. This thin film is formed by, for example, the sputtering method, and a magnetic recording medium having a basic cross-sectional structure such as that shown in FIG. 10 is produced. In an ordinary process, an Ni-P amorphous layer 102' is formed on an Al (aluminum) alloy substrate 101' by means of electroless plating, and a Cr layer 103', a recording layer 104' and a protective layer 105' are sucessively formed thereon to construct a magnetic recording medium. Since the recording layer 104' which contains Co as a principal component has a hexagonal crystallographic structure, the crystalline orientation of the recording layer is dependent on the sputtering conditions. For example, if such a recording layer is formed on a glass substrate, the C-axis of crystal tends to orient perpendicular to the film. In the longitudinal magnetic recording system in which recording is effected by magnetization in a direction parallel to the direction of travel, such a tendency is undesirable since the C-axis [0001] which is the magnetic easy axis orients perpendicularly to the substrate 101'.

The Cr layer 103' under the recording layer 104' is an underlayer which is formed in order to cause the C-axis of the recording layer 104' to extend horizontally. The effect of the Cr layer 10' is discussed in 1-200 of "Collection of Lecture Papers at General National Meeting of Electronic Communication Society (1985)". The Cr layer 103' which is formed by the sputtering method orients perpendicular pendicularly to the (110) plane, and when the Co—Ni recording layer 104' is succesively formed thereon, the recording layer 104' is epitaxially grown on the Cr layer 103', and a ($1\bar{1}00$) plane appears parallel to the film surface. More specifically, the C-axis of the recording layer 104' which is the magnetic easy axis is formed so as to extend horizontally. As a result, the in-plane coercivity Hc becomes high, i.e., about 700 Oe, but the magnetic recording medium in which the c-axis of the recording layer 104' which is the magnetic easy axis extends horizontally has the problem that the noise generated in read and write operations is increased.

As described above, in the prior art no consideration is given to the favorite crystallographic orientation of the recording layer, and the prior art therefore suffers from unfavorably large noise in read and write operations.

SUMMARY OF THE INVENTION

It is a first object of the present invention to provide a magnetic recording medium of the ferromagnetic metallic film type which has excellent magnetic properties, particularly a small value of modulation that represents the degree of low frequency variation of read output in read and write operations, and improved corrosion resistance, durability and reliability and is therefore suitable for high density recording.

The present inventors, as a result of exhaustive studies, have found that the value of modulation (modulation of read-signal envelope) greatly varies depending upon the central line average surface roughness Ra and maximum surface roughness Rmax of the magnetic film constituting a magnetic recording medium in a direction perpendicular to the direction of magnetic recording, together with the in-plane magnetic anisotropy energy Ku of the magnetic film. More specifically, we have found that it is possible to lower the value of modulation and hence obtain a magnetic recording medium having excellent read and write characteristics at high recording density by specifying the average surface roughness Ra and the maximum surface roughness Rmax in such a manner that, when Rmax varies within the range of $Rmax \leq 25Ra$ when Ra is within the range of 1 $nm \leq Ra \leq 20$ nm, the in-plane magnetic anisotropy energy Ku is selected so as to fall within the range of $0 \leq Ku \leq 8 \times 10^5$ erg/cm$^3$; when Rmax is within the range of $Rmax \leq 8Ra$, Ku is selected to fall within the range of $0 \leq Ku \leq 2 \times 10^5$ erg/cm$^3$; and when Rmax is within the range of $9Ra \leq Rmax \leq 25Ra$, Ku is selected to fall within the range of $0 \leq Ku \leq 8 \times 10^5$ erg/cm$^3$. Further, we have confirmed that, in a magnetic recording medium which employs a Co—Ni or Co—Cr based alloy thin film as a recording layer, if at least one of the elements, i.e., Zr and Ti, is added to the recording layer as a third element in an amount of 4 to 15 atomic (at) %, the magnetic anisotropy energy Ku is lowered, and that, if a Cr or Cr based alloy thin film having a thickness of 150 to 500 nm is provided as an underlayer (an intermediate layer between the recording layer and the substrate), the magnetic anisotropy energy Ku is further lowered and the value of modulation is consequently further reduced, which makes it possible to obtain a magnetic recording medium having excellent read and write characteristics at high recording density.

The central line average surface roughness (hereinafter referred to as the "average surface roughness") Ra in a direction perpendicular to the recording direction which is provided on the magnetic film of the magnetic recording medium according to the present invention is preferably selected so as to fall within the range of 1 $nm \leq Ra \leq 20$ nm and the maximum surface roughness Rmax is preferably set so as to satisfy the condition of $Rmax \leq 25Ra$, since an average surface roughness Ra smaller than 1 nm makes it difficult to produce the magnetic recording medium and leads to an unfavorable rise in cost, while an average surface roughness in excess of 20 nm results in an excessively rough surface which undesirably prevents the magnetic head from being stably kept spaced away from the surface of the magnetic recording medium at the required very small flying height. When the value of magnetic anisotropy energy Ku is selected so as to fall within the range of $0 \leq Ku \leq 2 \times 10^5$ erg/cm$^3$, Ra and Rmax are preferably set within the ranges of 1 $nm \leq Ra \leq 20$ nm and $Rmax \leq 8Ra$, more preferably 1.5 $nm \leq Ra \leq 4$ nm and $6Ra \leq Rmax \leq 8Ra$, respectively. It is further preferable to set Rmax within the range in which the absolute value of Rmax exceeds 20 nm and is not greater than 150 nm.

When the value of in-plane magnetic anisotropy energy Ku is selected so as to fall within the range of $0 \leq Ku \leq 8 \times 10^5$ erg/cm$^3$, Ra and Rmax are preferably set within the ranges of 1 $nm \leq Ra \leq 20$ nm and $Rmax \leq 25Ra$, more preferably 1 $nm \leq Ra \leq 20$ nm and $9Ra \leq Rmax \leq 25Ra$, furthermore preferably 4 $nm \leq Ra \leq 8$ nm and $9Ra \leq Rmax \leq 16Ra$, respectively.

The surface roughness provided on the magnetic film of the magnetic recording medium according to the present invention may be formed in such a manner that the surface of a predetermined substrate provided with, for example, a plated non-magnetic layer is polished using rapping powders having an appropriate size which enables formation of a desired surface roughness and a magnetic film is then formed on the polished surface.

A ferromagnetic metallic film made of a Co—Ni based alloy which is one example of the magnetic film of the magnetic recording medium according to the present invention preferably contains Ni in the range from 20 to 50%, more preferably from 33 to 47%, by atomic percentage with respect to Co, since a Ni content less than 20% lowers the coercivity Hc, whereas, a Ni content in excess of 50% lowers the saturation magnetic flux density Bs. The amount of at least one of Zr and Ti which is to be added to the Co—Ni based alloy is preferably selected so as to fall within the range from 4 to 15%, more preferably from 5 to 10%, by atomic percentage with respect to the total amount of Co and Ni, since a third element amount less than 4% is less effective in improving the corrosion resistance, whereas a third element amount in excess of 15% deteriorates the saturation magnetic flux density Bs. In the case of a magnetic film made of a Co—Cr based alloy, the Cr content is preferably not greater than 20% since a Cr content in excess of 20% lowers the saturation magnetic flux density Bs, and the amount of at least one of Zr and Ti added to the Co—Cr based alloy is preferably selected so as to fall within the range from 4 to 15%, more preferably from 5 to 10%, with respect to the total amount of Co and Cr from the same reason as in the case of the abovedescribed magnetic film made of a Co—Ni based alloy.

In the magnetic recording medium according to the present invention, if a thin film made of Cr or an alloy containing Cr as a principal component is provided as an underlayer (an intermediate layer between the substrate and the magnetic film) for the magnetic film made of either a Co—Ni or Co—Cr based alloy, orientation of the magnetic film is controlled by the underlayer, so that the value of magnetic anisotropy energy Ku is further lowered and it is therefore possible to stably produce a magnetic recording medium which has a small value of modulation and excellent read and write characteristics at high recording density. The film thickness of the underlayer made of Cr or the like is preferably selected so as to fall within the range from 150 to 500 nm, more preferably from 200 to 300 nm, since a film thickness less than 150 nm deteriorates adhesion to the recording layer, resulting unfavorably in a large Ku value and a small Hc value, whereas a film thickness in excess of 500 nm undesirably lowers the strength in slide contact between the magnetic recording medium and the magnetic head or the like.

It is a second object of the present invention to provide a highly reliable magnetic recording medium for a high recording density magnetic disk which employs a ferromagnetic metallic film as a recording layer, said magnetic recording medium being improved so that the noise generated in read and write operations is reduced and the medium has excellent magnetic properties, together with a process for producing said magnetic recording medium.

The above-described object of the present invention is attained by controlling the crystallographic orientation of the magnetic film. More specifically, the present inventors evaluated the crystallographic orientation of various magnetic films by means of the reflection high-speed electron diffraction (RHEED) and investigated the relationship between the crystallographic orientation and the size of noise generated in read and write operations in relation to the magnetic recording medium. As a result, we have found that, the more random the crystallographic orientation of the magnetic film and the more excellent the crystallizability, the smaller the noise. We have also found that, if an underlayer for the magnetic film is defined by a thin film made of an alloy containing as a principal component at least one of Cr and Mo, which have a body-centered cubic structure, and the thin film is formed so as to have random crystallographic orientation and a reduced crystalline size, then the crystallographic orientation of the magnetic film formed thereon can be made random and it is possible to epitaxially grow a magnetic film having excellent crystallizability. The crystallographic orientation of the thin film of Cr or the like which serves as an underlayer for the magnetic film can be made random and the crystalline size thereof can be reduced simply by adding a predetermined amount of an oxidizing gas, e.g., oxygen, air or water vapor, to an Ar gas atmosphere which is used when said thin film is formed by a method such as vacuum evaporation, sputtering, ion beam sputtering or ion plating. Further, a magnetic film is epitaxially grown on the thin film of Cr or the like thus formed so as to have random crystallographic orientation and a reduced crystalline size, by removing the oxidizing gas from the Ar gas used for vacuum evaporation or sputtering and lowering the gas pressure to a predetermined value. In this way, it is possible to form a thin film which is dense and has excellent crystallizability.

In the case where a thin film of Cr or the like which serves as an underlayer for the magnetic film made of a Co based alloy is formed in an oxidizing atmosphere by a method such as vacuum evaporation or sputtering, the oxygen concentration is preferably selected so as to fall within the range from 0.05 to 1%, more preferably from 0.5 to 1%, by volume, since an oxygen concentration less than 0.05% undesirably increases the grain size of Cr or the like and causes the magnetic easy axis (c-axis) to orient in one direction within the plane of the film, whereas an oxygen concentration in excess of 1% causes chromium oxides such as $Cr_2O_3$ to be produced, which prevents the crystallographic orientation of the magnetic film epitaxially grown on the thin film from becoming random, resulting in the c-axis extending in a direction perpendicular to the film surface, undesirably.

The thin film which is formed so as to serve as an underlayer for the magnetic film needs to have random crystallographic orientation and a very small grain size. For this reason, the thin film is preferably formed using a metal having a body-centered cubic structure, e.g., Cr or Mo, or an alloy containing such a metal as a principal component. The film thickness of the underlayer for the magnetic film is preferably selected so as to fall within the range from 50 to 2000 nm, more preferably from 100 to 1000 nm, since a film thickness less than 50 nm results in insufficiently random crystallographic orientation of the magnetic film and makes it impossible to epitaxially grow a film having excellent crystallizability, whereas a film thickness in excess of 2000 nm lowers the mechanical strength required for the magnetic disk, undesirably.

DESCRIPTION OF THE PREFERRED EMBODIMENTS

Figure 1:
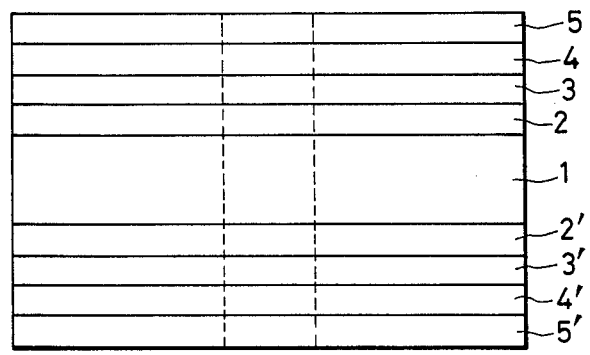
FIG. 1 schematically shows the cross-sectional structure of a magnetic disk produced in Example 1 of the present invention.

It is generally preferable that magnetic recording media such as magnetic disks have constant magnetic properties in the circumferential direction of each magnetic disk. More specifically, it is considered preferable from the viewpoint of uniformity of read output and reduction of modulation errors that the magnetic easy axis within the circumferential plane extend in a fixed direction and the size of residual spontaneous magnetization be constant. However, in magnetic recording media actually produced, the magnetic easy axes of the magnetic film extend in various directions or in the same one direction within the plane. In such a case, the read output varies at various positions in the circumferential direction, and the envelope of the waveform of the read output shows variations known as modulation. In general, it is difficult to control the direction of the magnetic easy axis of the magnetic film from the viewpoint of process. However, if the value of in-plane magnetic anisotropy energy Ku of the magnetic film is decreased and the surface roughness of the magnetic film is appropriately controlled, it is eventually possible to reduce the width of read output variations depending upon the position on the circumference of the magnetic recording medium even if the magnetic easy axis does not extend in the desired direction as described above. The relationship between the magnetic anisotropy energy Ku and the modulation in this case is greatly affected by the surface roughness of the magnetic film of the magnetic recording medium. For example, if a comparison is made between a magnetic recording medium having a surface roughness in a direction perpendicular to the direction of travel of the magnetic recording medium which is represented by $1 \text{ nm} \leq Ra \leq 20 \text{ nm}$ and $Rmax \leq 8Ra$ and a magnetic recording medium having a surface roughness represented by $1 \text{ nm} \leq Ra \leq 20 \text{ nm}$ and $9Ra \leq Rmax \leq 25Ra$, the latter has a smaller value of modulation for the same value of magnetic anisotropy energy Ku. Considering the fact that the specifications with respect to the magnetic anisotropy energy Ku differ depending upon the surface roughness, it may be possible to enhance the magnetic shape anisotropy in the direction of travel of the magnetic recording medium and reduce the effect of Ku by intentionally increasing the degree of surface roughness of the magnetic film in a direction perpendicular to the medium traveling direction. When such a surface treatment is applied to a magnetic recording medium, it is possible to achieve various advantages over a magnetic recording medium not subjected to the surface treatment, such as improvements in magnetic properties, less sticking between the magnetic head and the medium and an improvement in traveling performance, but, at the same time, the surface-treated magnetic recording medium suffers from disadvantages such as deterioration of magnetic head flying characteristics and lowering in economy due to addition of manufacturing steps in the process for producing the magnetic recording medium. Thus, the surface treatment involves both merits and demerits. Whether the surface treatment is to be carried out or not is determined in accordance with the specifications of each individual type of magnetic recording medium such as magnetic disks.

The in-plane magnetic anisotropy energy Ku of the magnetic film can effectively be reduced by adding, as a third element, at least one of Zr and Ti to the magnetic film of a magnetic recording medium which is defined by a Co—Ni or Co—Cr based alloy thin film which is one example of the present invention. These magnetic films made from Co—Ni and Co—Cr based alloys advantageously enable a dense oxide film to be readily formed on the surface of the film and also permit corrosion resistance to be considerably improved by so-called passivation. Further, formation of an underlayer (underlayer for the magnetic film) of Cr or an Cr based alloy between the magnetic film and the substrate enables the orientation of the magnetic film to be controlled by the underlayer, so that it is possible to stably produce a magnetic recording medium having a minimized value of modulation.

The present invention will be described hereinunder in more detail by way of Examples and with reference to the accompanying drawings.

(EXAMPLE 1)

FIG. 1 shows the cross-sectional structure of a magnetic disk in accordance with Example 1.

A substrate 1 made of an Al alloy and having an outer diameter of 130 mm, an inner diameter of 40 mm and a thickness of 1.9 mm was prepared. Plated non-magnetic layers 2 and 2' each made of a Ni—P or Ni—W—P based alloy and having a thickness of 20 μm were formed on the substrate 1. The surfaces of the plated non-magnetic layers 2 and 2' were polished using, for example, $Al_2O_3$ abrasive tape having an abrasive grain size of ¼ to 10 μm in order to control the surface roughtness so that a predetermined average surface roughness Ra and maximum surface roughness Rmax were obtained on the magnetic film of the magnetic disk. Cr films 3 and 3' each having a predetermined film thickness were formed on both surfaces, respectively, of the substrate 1 provided with the plated non-magnetic layers 2, 2' and having the surface rough controlled appropriately, by the sputtering method using Cr target and under the conditions that the substrate temperature was 180° C., the Ar gas pressure, 5 mTorr, and the RF power density, 4 W/cm². Magnetic films 4 and 4' each having a thickness of 60 mm were formed on the Cr films 3 and 3', respectively, by the sputtering method using a Co—30 (representing at %) Ni alloy target and a Co—Ni alloy target mixed with 7 or 8 at % of Zr or Ti and under the same sputtering conditions as the above. The composition of the magnetic films 4 and 4' was substantially coincident with that of the correspondign target. Further, protective lubricant layers 5 and 5' made of C were formed on the magnetic films 4 and 4', respectively, by the sputtering method under the same conditions as the above.

Read and write characteristics of the magnetic disks thus produced were measured under the following conditions:

Head used . . . Mn—Zn ferrite head
Head gap length . . . 0.3 μm
Head spacing . . . 0.2 μm Further, magnetic anisotropy energy Ku was measured using a magnetic torque meter. Results are shown in Table 1 below.

TABLE 1

| Samples | Surface roughness Ra (nm) | Surface roughness Rmax (nm) | Cr film thickness (nm) | Composition of magnetic films (at %) | Ku (erg/cm³) | Modulation (Emax − Emin)/ (Emax + Emin) (%) |
| --- | --- | --- | --- | --- | --- | --- |
| 1 | 4 | 30 | 250 | Co—30Ni | $2.4 \times 10^5$ | 20 |
| 2 | 3 | 20 | 100 | Co—35Ni—8Ti | $3.5 \times 10^5$ | 25 |
| 3 | 8 | 60 | 250 | Co—30Ni—7Ti | $1.2 \times 10^5$ | 11 |
| 4 | 4 | 25 | 250 | Co—27Ni—8Zr | $1.4 \times 10^5$ | 12 |
| 5 | 2 | 15 | 500 | Co—25Ni—7Zr | $1.0 \times 10^5$ | 8 |
| 6 | 5 | 80 | 250 | Co—30Ni | $7.0 \times 10^5$ | 15 |

TABLE 1-continued

| Samples | Surface roughness Ra (nm) | Surface roughness Rmax (nm) | Cr film thickness (nm) | Composition of magnetic films (at %) | Ku (erg/cm$^3$) | Modulation (Emax − Emin)/ (Emax + Emin) (%) |
| --- | --- | --- | --- | --- | --- | --- |
| 7 | 10 | 200 | 100 | Co—35Ni—8Ti | 3.5 × 10$^5$ | 8 |
| 8 | 7 | 65 | 250 | Co—30Ni—7Ti | 2.0 × 10$^5$ | 5 |
| 9 | 8 | 130 | 250 | Co—27Ni—8Zr | 3.0 × 10$^5$ | 6 |
| 10 | 15 | 300 | 500 | Co—25Ni—7Zr | 1.0 × 10$^5$ | 4 |

Figure 2:
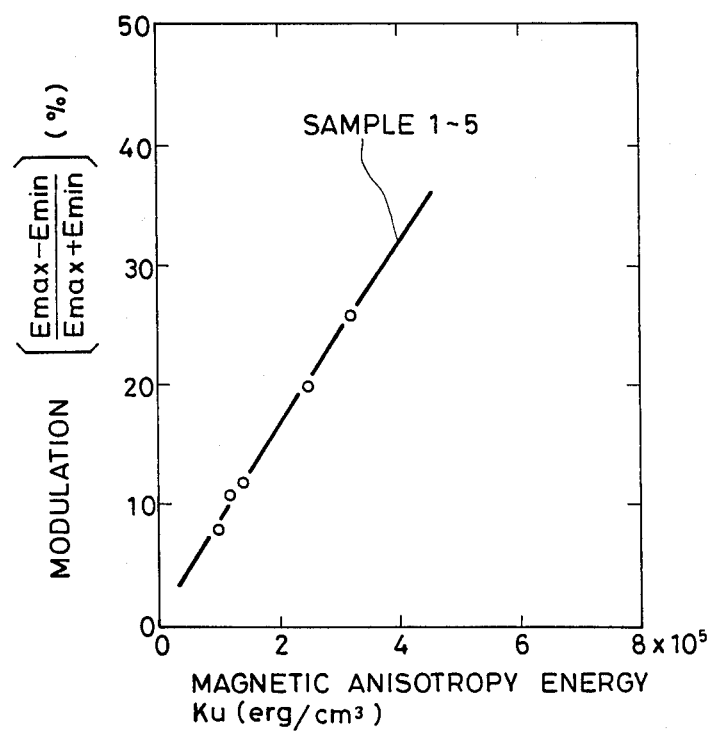
FIGS. 2 and 3 are graphs showing the relationship between in-plane magnetic anisotropy energy Ku and modulation of samples of the magnetic disk produced in Example 1.

Samples 1 to 5 shown in Table 1 are magnetic disks formed by employing substrates having their surfaces polished so that the relationship between the surfaces roughnesses Ra and Rmax of the magnetic films of the respective media satisfied the contradiction of Rmax $\leq$ 8Ra when Ra was selected so as to fall within the range of 1 nm $\leq$ Ra $\leq$ 20 nm, setting the Cr film thickness at 100, 250 and 500 nm, respectively, and employing as the magnetic films Co—30Ni, Co—30 Ni—8Zr and Co—30Ni—8Ti alloy thin films, respectively. The relationship between the magnetic anisotropy energy Ku (erg/cm$^3$) and modulation [(Emax−Emin) / (Emax+Emin) (%)] is shown in FIG. 2. As will be clear from the figure, when the value of Ku satisfies the condition of $0 \leq Ku \leq 2 \times 10^5$ erg/cm$^3$, the value of modulation is less than 20%.

It will be understood from the comparison between the samples 1 and 3, 4 shown in Table 1 that the addition of 7 to 8 at % of Ti or Zr to the magnetic film of a Co—Ni based alloy enables the values of Ku and modulation to lower by about 40 to 50% despite the same film forming conditions.

Figure 3:
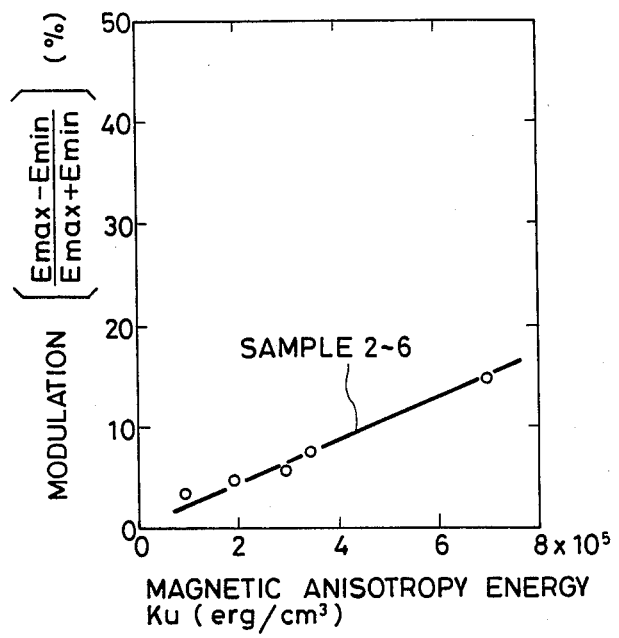

Samples 6 to 10 shown in Table 1 are magnetic disks produced under the same conditions as those for the abovedescribed samples 1 to 5 by using substrates having their surfaces polished so that the relationship between the surfaces roughnesses Ra and Rmax of the magnetic films of the respective media satisfied the condition of $9Ra \leq Rmax \leq 25Ra$ when Ra was selected so as to fall within the range of 1 nm $\leq$ Ra $\leq$ 20 nm. The relationship between Ku and modulation is shown in FIG. 3. As will be clear from the figure, the samples 6 to 10 had the values of modulation (%) smaller than those of the samples 1 to 5 although the media had the same values for Ku (erg/cm$^3$), and the value of modulation was less than 10% when the value of Ku satisfied the condition of $0 \leq Ku \leq 4 \times 10^5$ erg/cm$^3$. The recording densities D$_{50}$ (recording density at which the read output is ½ of the read output at low recording density) of all of these magnetic disks were about 23 kFCI (magnetic Flux Change per Inch), but the read output showed about a 20% increase. Comparison between the samples 6 and 8, 9 shows that the addition of 7 to 8 at % of Ti or Zr to a Co—Ni based alloy magnetic film enables the values of magnetic anisotropy energy Ku and modulation to be lowered 60 to 70% despite the same film forming conditions.

(EXAMPLE 2)

By employing substrate 1 which are similar to those used for the samples 1 to 10 in Example 1 and which had the plated non-magnetic layers 2, 2' formed thereon, Cr films 3 and 3' each having a predetermined film thickness were formed on both surfaces, respectively, of each of the substrates 1 by the sputtering method under the conditions that the substrate temperatures was 150° C., the Ar gas pressure, 15 mTorr, and the RF power density, 6 W/cm$^2$. Magnetic films 4 and 4' each having a film thickness of 70 nm were formed on the Cr films 3 and 3', respectively, under the same sputtering conditions as the above and employing as targets Co—Ni alloy and Co—Ni alloys which were mixed with 5 at %, 10 at % and 15 at % of Zr. Protective lubricant layers 5 and 5' composed of C films each having a film thickness of 50 nm were formed on the magnetic films 4 and 4', respectively, in the same way as in Example 1, thus producing magnetic disks shown as samples 11 to 25 in Table 2 below. Read and write characteristics and magnetic anisotropy energy Ku of the magnetic disks thus produced were measured in the same manner as in Example 1. The results are shown in Table 2.

TABLE 2

| Samples | Surface roughness Ra (nm) | Surface roughness Rmax (nm) | Cr film thickness (nm) | Composition of magnetic films (at %) | Ku (erg/cm$^3$) | Modulation (Emax + Emin)/ (Emax + Emin) (%) |
| --- | --- | --- | --- | --- | --- | --- |
| 11 | 5 | 40 | 150 | Co—40Ni | 3.9 × 10$^5$ | 31 |
| 12 | 6 | 40 | 250 | Co—39Ni | 2.5 × 10$^5$ | 20 |
| 13 | 5 | 30 | 500 | Co—39Ni | 1.5 × 10$^5$ | 12 |
| 14 | 4 | 30 | 150 | Co—20Ni—5Zr | 2.4 × 10$^5$ | 18 |
| 15 | 5 | 35 | 250 | Co—30Ni—5Zr | 1.1 × 10$^5$ | 11 |
| 16 | 5 | 30 | 500 | Co—20Ni—5Zr | 1.0 × 10$^5$ | 7 |
| 17 | 3 | 20 | 150 | Co—20Ni—10Zr | 2.2 × 10$^5$ | 18 |
| 18 | 7 | 55 | 250 | Co—20Ni—9Zr | .1.2 × 10$^5$ | 10 |
| 19 | 5 | 35 | 500 | Co—19Ni—10Zr | 0.9 × 10$^5$ | 6 |
| 20 | 4 | 30 | 150 | Co—50Ni—5Zr | 2.6 × 10$^5$ | 20 |
| 21 | 3 | 25 | 250 | Co—45Ni—5Zr | 1.2 × 10$^5$ | 11 |
| 22 | 3 | 20 | 500 | Co—49Ni—5Zr | 0.9 × 10$^5$ | 6 |
| 23 | 5 | 35 | 150 | Co—49Ni—15Zr | 2.4 × 10$^5$ | 19 |
| 24 | 5 | 30 | 250 | Co—50Ni—16Zr | 1.1 × 10$^5$ | 11 |
| 25 | 6 | 40 | 500 | Co—50Ni—15Zr | 1.0 × 10$^5$ | 8 |

Figure 4:
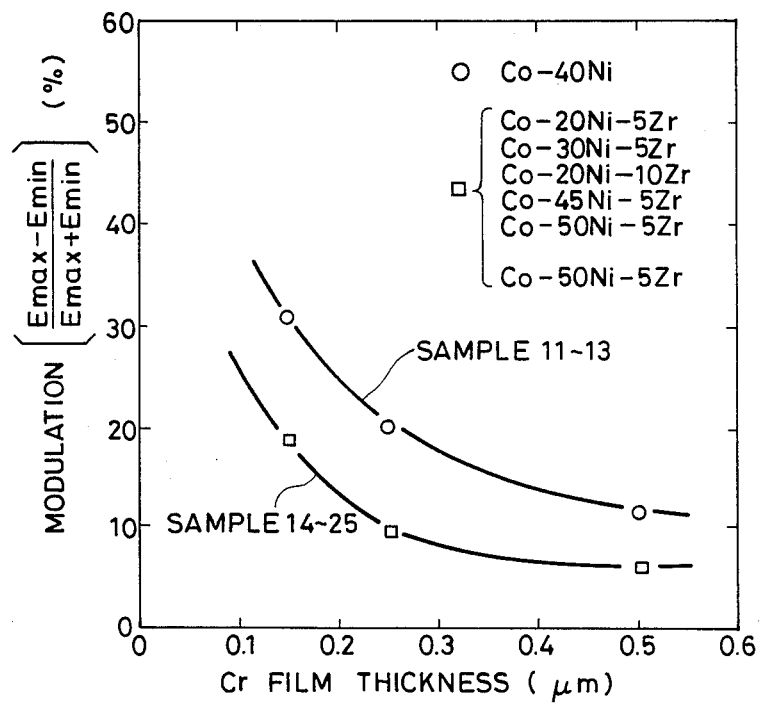
FIG. 4 is a graph showing the relationship between Cr film thickness and modulation in Example 2.

Samples 11 to 25 shown in Table 2 are magnetic disks formed by employing substrates having their surfaces polished so that the relationship between the surface roughnesses Ra and Rmax of the magnetic films of the respective media satisfied the conditions of 1 nm $\leq$ Ra $\leq$ 20 nm and Rmax $\leq$ 8Ra, and setting the Cr film thickness at 150, 250 and 500 nm, respectively, and forming as respective recording layers thin films of about Co—40Ni, Co—20Ni—5Zr, Co—20Ni—10Zr, Co—50Ni—5Zr and Co—50Ni—15Zr alloys each having a film thickness of 700 Å. The relationship between the modulation [(Emax−Emin)/(Emax+Emin)(%)] and Cr film thickness (μm) is shown in FIG. 4. As will be clear from the figure, as the Cr film thickness increased the modulation of the magnetic disks lowered, and when the Cr film thickness changed from 0.15 μm to 0.5 μm, the value of modulation lowered from 31% to 19% for the Co—Ni alloy and from 20% to 8% for all of the Co—Ni—Zr based alloys. It is found from a comparison between the Co—Ni based alloy thin films of the samples 11 to 13 shown in Table 2 and the Co—Ni—Zr based alloy thin films of the samples 14 to 25 that the latter films had 40 to 50% lowering in modulation. Such a tendency is not limited to the case where Zr is added, but a similar result was obtained in the case where Ti was added also. Ternary or quaternary alloys formed by adding Ti or Zr to Co—Ni based alloys were considerably improved also in corrosion resistance as compared with the former Co—Ni based alloys. In Co—Ni based alloy thin films, Co—20Ni and Co—50Ni alloy thin films also showed similar effects to those of the samples 11 to 13. The relationship between Cr film thickness and modulation in the samples 11 to 25 showed similar results also in the case where substrates similar to those employed in the samples 2 to 6 shown in Table 1 were used.

Although Co—Ni based alloys have been taken as examples of materials for thin films to define recording layers in the above-described Examples 1 and 2 of the present invention, it should be noted here that similar effects are also produced in the case of magnetic films or the like formed by adding at least one of Ti and Zr to Co—Cr based alloys.

Although the present invention has been described above by way of Examples in which the invention is applied to magnetic disks formed using Al substrates provided with plated non-magnetic layers (Ni—P or Ni—W—P), the present invention is not necessarily limited to such media but may be applied to magnetic disks using ceramics substrates, floppy disks, magnetic tapes, etc. Further, the film forming method which can be employed in the present invention is not necessarily limitative to the sputtering method, but it is, as a matter of course, possible to employ other methods such as ion beam sputtering, ion plating, vacuum evaporation and various plating methods.

As has been described in detail, the present invention provides a magnetic recording medium in which the central line average surface roughness Ra and maximum surface roughness Rmax in a direction perpendicular to the recording direction are set within predetermined ranges, respectively, and the in-plane magnetic anisotropy energy Ku in the magnetic film serving as a recording layer is set so as to be smaller than a predetermined value, so that the corrosion resistance is improved and it is possible to reduce considerably the value of modulation which represents the degree of variation of read output. Accordingly, it is possible to obtain a magnetic recording medium of high durability and reliability which is suitable for high density magnetic recording.

When a thin film of Cr or the like which defines an underlayer for a magnetic film made from a Co based alloy is formed by a method such as vacuum evaporation or sputtering in an oxidizing atmosphere, addition of an oxidizing gas causes generation of a large number of crystal nuclei and also concentration of oxygen atoms to the gain boundaries, thus hindering the growth of grains. In consequence, there is no orientation based on the crystal growth anisotropy, and a formed thin film of Cr or the like results in an aggregate of crystallites having random crystallographic orientation. Such random crystallographic orientation may be obtained by increasing the gas pressure (e.g, the Ar gas pressure). In this case, however, voids are produced between grains, and this leads to lowering in mechanical strength of a thin film of Cr or the like which defines an underlayer for the magnetic film. Therefore, such a means cannot be employed.

In the formation of a magnetic film on a thin film of Cr or the like serving as an underlayer, the magnetic film can be epitaxially grown on the thin film by removing the oxidizing gas, and it is possible to form a magnetic film which is dense and has excellent crystallizability by lowering the gas pressure (e.g., the Ar gas pressure).

The present invention will be further described below in detail by way of Examples and with reference to the drawings.

(EXAMPLE 3)

Figure 5:
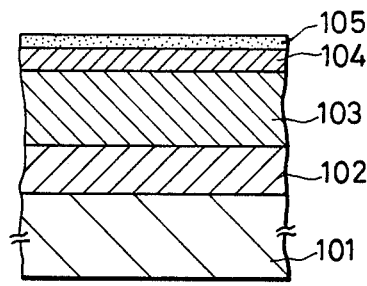
FIG. 5 schematically shows the cross-sectional structure of magnetic disks produced in Examples 3, 4, 5 and 6 of the present, invention.
Figure 9:
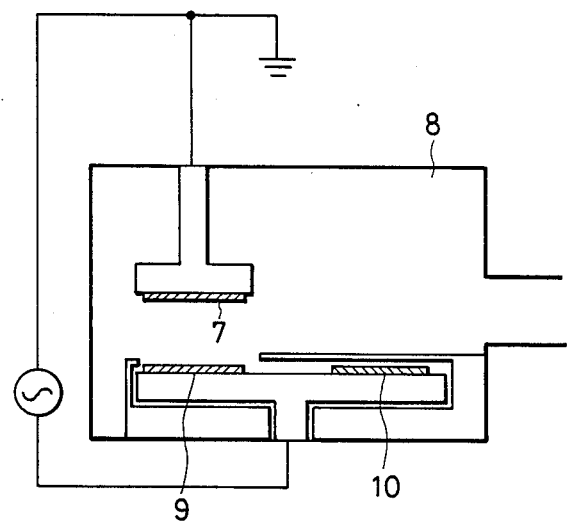
FIG. 9 schematically shows the structure of an RF magnetron sputtering machine employed to form thin films in Examples 3, 4, 5 and 6.

Formation of a thin film was carried out using an ordinarily employed RF magnetron sputtering machine 8 such as that shown in FIG. 9. The cross-sectional structure of the thin film thus formed is shown in FIG. 5. A substrate 101 made of an aluminum based alloy and having a diameter of 125 mm was employed, and an Ni—P amorphous layer 102 was formed on the surface of the substrate 101 by the electroless plating method. After the interior of the sputtering machine 8 had been evacuated to $3 \times 10^{-5}$ Pa, a gas formed by adding 1% by volume of $O_2$ to Ar gas was introduced into the sputtering machine 8, and with the overall pressure adjusted to 1 Pa, an RF power of 2 kW was applied to generate a plasma, thereby effecting sputtering from a Cr target 9, and thus forming a Cr film 103 which defines an underlayer having a film thickness of 250 nm. Thereafter, the Cr target 9 was exchanged for a Co—Ni target 10 by rotating the table within the sputtering machine 8. After the interior of the machine 8 had been evacuated to $3 \times 10^{-5}$ Pa, Ar gas was introduced until the pressure reached 1 Pa. In this state, a magnetic film 104 made from a Co—20 at % Ni alloy and having a thickness of 50 nm was formed with an RF power of 2 kW and at a substrate temperature of 200° C. Thereafter, an ordinary protective film 105 was provided to produce a magnetic disk.

Figure 6:
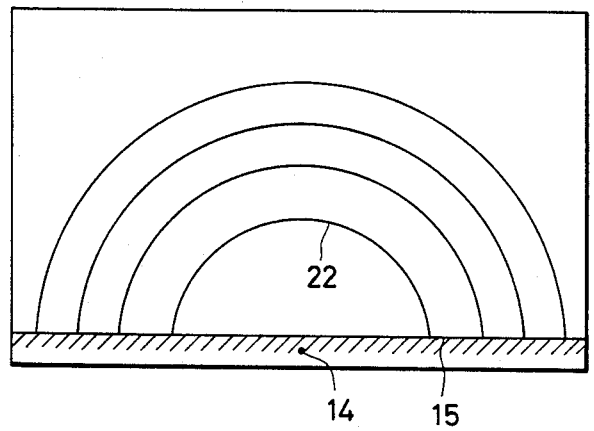
FIG. 6 shows an RHEED pattern of the Cr film in Example 3.
Figure 7:
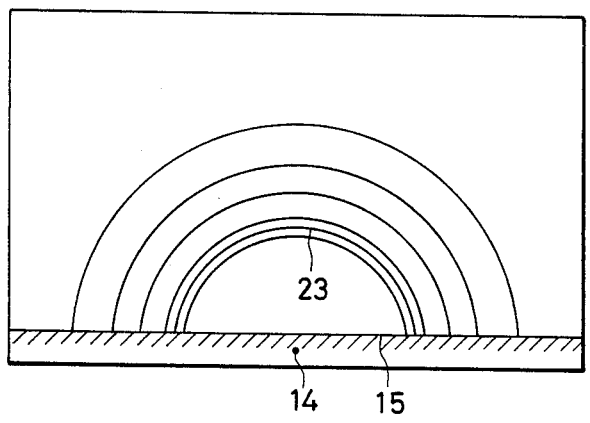
FIG. 7 shows an RHEED pattern of the magnetic film in Example 3.

Then, orientation of each of the Cr film 103 and magnetic film 104 of the magnetic disk produced in accordance with the above-described procedure was examined by the RHEED method. The results are shown in FIGS. 6 and 7, respectively. The RHEED patterns for both the films had ring-shaped configurations, which shows that the films have no orientation in a specific direction. In FIGS. 6 and 7, the reference numeral 14 denotes the incident beam position, 15 the sample edge, and 22 the 002 diffraction line.

The diffraction spot intensity of the RHEED pattern of the magnetic film 104 shown in FIG. 7 was measured in terms of the degree of blackening of a film using a microphotometer. The results showed that the diffraction spot intensity ratio of the 0002 reflection to the 1$\bar{1}$00 reflection was 2.8:1 and close to the X-ray diffraction spot intensity ratio 3:1 of powder samples. Noise characteristics in read and write operations of the magnetic disk were measured as follows: The magnetic head used was a Mn—Zn ferrite head having a gap length of 0.5 μm; the relative speed between the magnetic head and the medium was 20 m/s; and the spacing was 0.21 μm. The results of measurement showed that the noise up to 9 MHz was 6.4 μVrms (root mean square).

(EXAMPLE 4)

In the formation of the Cr film 103, a gas formed by adding 0.5% by volume of $O_2$ gas to Ar was employed. The other film forming conditions were the same as those in Example 3. The uppermost magnetic film 104 showed somewhat crystallographic orientation in the direction of (1$\bar{1}$00), and the diffraction spot intensity ratio of the 0002 reflection to the 1$\bar{1}$00 reflection was 1 4:1. The noise in relation to a magnetic disk formed using this magnetic film was measured. The results of measurement showed that the noise up to 9 MHz was 9.3 μVrms.

(EXAMPLE 5)

In the formation of the Cr film 103, a sputtering gas formed by adding 0.1% by volume of $O_2$ gas to Ar was employed. The other film forming conditions were the same as those in Example 3. The magnetic film 104 showed a considerably high degree of crystallographic orientation in the direction of (1100), and the diffraction spot intensity ratio of the 0002 reflection to the 1100 reflection was 0.3:1. The noise in relation to a magnetic disk using this magnetic film was measured. The results of measurement showed that the noise up to 9 MHz was 16.2 μVrms.

(EXAMPLE 6)

In the formation of each of the Cr and magnetic films 103 and 104, a gas formed by adding 1% by volume of $O_2$ gas to Ar was employed. The degree of crystallographic orientation of the magnetic film 104 was the same as in Example 3, but the diffraction line was broad, so that the half-width of the diffraction line measured with a microphotometer was about double that in Example 3.

The noise in relation to this magnetic film was 12.8 μVrms.

(COMPARATIVE EXAMPLE 1)

Figure 10:
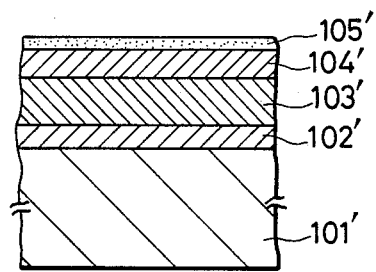
FIG. 10 schematically shows the basic cross-sectional structure of a magnetic recording medium for an ordinary magnetic disk.
Figure 11:
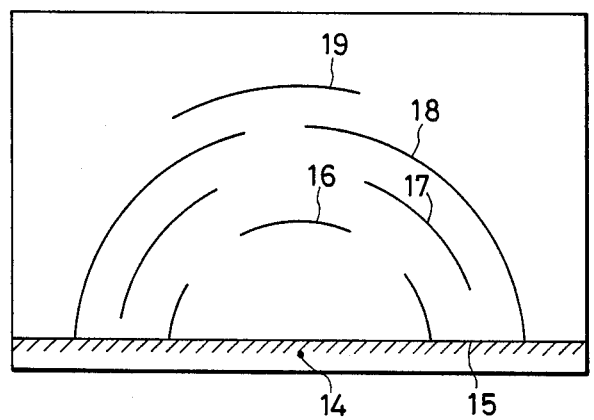
FIG. 11 shows an RHEED pattern of a Cr film formed in a conventional method (Comparative Example 1)

A magnetic disk was produced by the conventional method described below. Namely, the formation of a thin film was carried out using an RF magnetron sputtering machine 9 shown in FIG. 9. The cross-sectional structure of the thin film thus formed is shown in FIG. 10. A Cr film 103' was first formed on an aluminum alloy substrate (diameter: 125 mm) having a Ni—P amorphous layer 102' formed on the surface by electroless plating. After the interior of the sputtering machine 8 had been evacuated to $3\times10^{-5}$ Pa, Ar gas was introduced until the pressure reached 1 Pa. In this state, an RF plasma was generated to effect sputtering from a Cr target 9. The thickness of the Cr film 103' was 250 nm, the applied RF power was 2 kW, and the substrate temperature was 200° C. In the actual magnetic film forming process, the target was then exchanged for another by rotating the table within the sputtering machine 8 to form a magnetic film 104'. In this Example, however, before the formation of the magnetic film 104', another Cr film 103' formed on a substrate 101' provided with a Ni—P amorphous layer 102' under the same conditions as the above was observed by the RHEED method. The results are shown in FIG. 11. As will be clear from the figure, a pattern representing the fact that the film plane oriented in the direction of (110) was obtained. In FIG. 11, the reference numeral 16 denotes the 110 diffraction line, 17 the 200 diffraction line, 18 the 211 diffraction line, 19 the 220 diffraction line, 14 the incident beam position, and 15 the sample edge.

Figure 12:
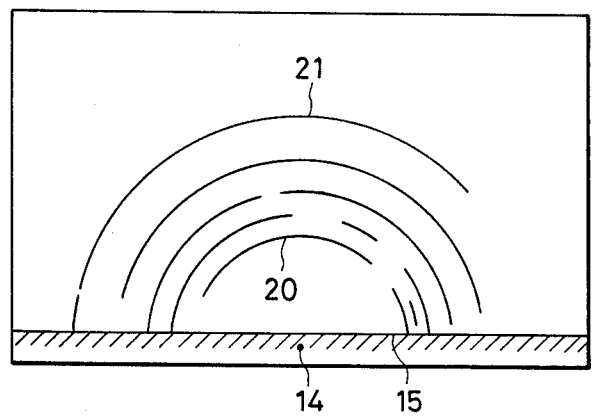
FIG. 12 shows an RHEED pattern of a magnetic film produced by a conventional method (Comparative Example 1).

Then, a Co—Ni (Ni 20 at %) magnetic film 104' having a thickness of 50 nm was formed on the Cr film 103' at a substrate temperature of 200° C. The conditions for forming the magnetic film 104' were the same as those for the Cr film 103'. As will be clear from FIG. 12, the RHEED pattern of the magnetic film 104' showed orientation in the direction of (1$\bar{1}$00), that is, the pattern showed the fact that the c-axis of the magnetic film 104' extended in parallel to the film surface. In the figure, the reference numeral 20 denotes the 1$\bar{1}$00 diffraction line, 21 the 2$\bar{2}$00 diffraction line, 14 the incident beam position, and 15 the sample edge.

Noise characteristics in read and write operations of the magnetic disk produced by the above-described conventional technique were measured by the same method as in Example 3. The results showed that the noise up to 9 MHz was 19.8 μVrms.

(COMPARATIVE EXAMPLE 2)

In the formation of the Cr film 103 shown in FIG. 5, a gas formed by adding 5% by volume of $O_2$ gas to Ar was employed as a sputtering gas. The other film forming conditions were the same as those in Example 3. The Cr film was oxidized to become $Cr_2O_3$. The magnetic film formed thereon showed a high degree of orientation in the direction of (0001). The diffraction spot intensity ratio of the 0002 reflection and 1$\bar{1}$00 reflection of the RHEED pattern was 5.3:1. The noise of the magnetic disk was 23.6 μVrms.

Figure 8:
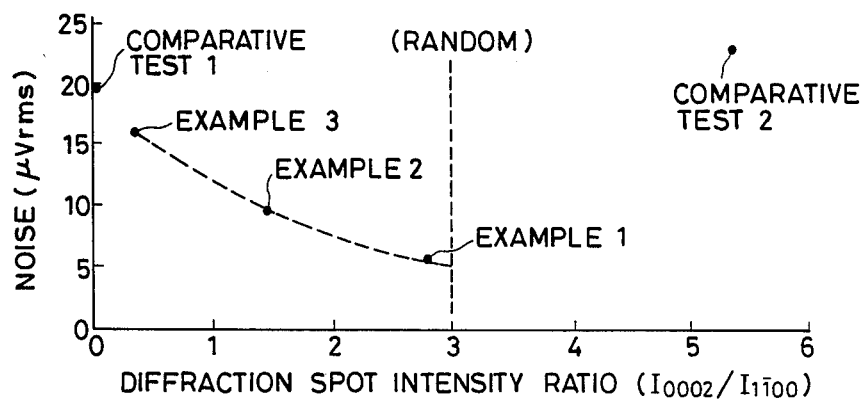
FIG. 8 is a graph showing the relationship between diffraction spot intensity ratio of the RHEED patterns of the magnetic films in Examples 3, 4, 5 and 6 and noise generated in read and write operations in relation to the magnetic disk.

As shown in the above-described Examples 3, 4, 5 and 6 and Comparative Examples 1 and 2, relationship is found between the crystallographic orientation of the magnetic film made of a Co based alloy and the read and write signal noise. More specifically, if the degree of crystallographic orientation of the magnetic film is represented by the diffraction spot intensity ratio of the 0002 reflection to the 1$\bar{1}$00 reflection on in the RHEED diffraction, the noise is related to the diffraction spot intensity ratio as shown in FIG. 8. Thus, the noise generated in read and write operations of the magnetic disk can be minimized by forming the magnetic film so as to have random orientation [diffraction spot intensity ratio $(I_{0002}/I_{1\bar{1}00}) \approx 3$].

As shown in the above-described Examples, when a Cr film serving as an underlayer for a magnetic film made from a Co based alloy is formed by sputtering or vacuum evaporation, the crystallographic orientation of the Cr film can effectively be made random and also the grain size of the Cr film can be made very small by adding about 0.05 to 1% by volume of oxygen gas to Ar gas. The formation of the Cr film having random crystallographic orientation enables the Co based alloy magnetic film expitaxially grown thereon to have random crystallographic orientation. In addition, it is possible to form a magnetic film having excellent crystallizability, so that the noise generated in read and write operations can be reduced considerably.

It is a matter of course that the concentration of oxygen gas which is most suitable for making the crystallographic orientation of the Cr underlayer film random differs depending upon the type of sputtering machine of vacuum evaporation machine employed.

Although in the above-described Examples 3, 4, 5 and 6 of the present invention, a Cr film has been exemplarily employed as an underlayer provided in order to produce random crystallographic orientation of the magnetic film serving as a recording layer, it has been confirmed that equivalent effects are also produced by using alloys containing Cr as a principal component and metals or alloys having a body-centered cubic structure such as Mo or Mo based alloys. Further, although in the above-described Examples a Co—Ni based alloy was employed as a material for a Co based alloy magnetic film to be epitaxially grown on a Cr film serving as an underlayer, it is also possible to employ Co as an element, Co—Cr, Co—Pd, Co—Fe, Co—Fe—Cr, Co—Ni—Cr, Co—Fe—Ni, Co—Ti, Co—Cu and the like, and in such cases also, advantageous effects similar to those in the described Examples are obtained. Although the sputtering method was employed as a film forming method, it is, of course, possible to produce the magnetic recording medium according to the present invention using other methods such as ion beam sputtering, ion plating and vacuum evaporation.

As has been described in detail, the process for producing a magnetic recording medium according to the present invention enables formation of a magnetic film having random crystallographic orientation and excellent crystallizability, so that is is possible to considerably reduce the noise generated in read and write operations of the magnetic recording medium. Accordingly, it is possible to obtain a magnetic recording medium which has excellent magnetic properties and improved performance and reliability and which is suitable for high density recording.

What is claimed is:

1. A magnetic recording medium having a magnetic film formed on a substrate through an underlayer having a thickness from 150–500 nm, characterized in that the central line average surface roughness Ra and maximum surface roughness Rmax of said magnetic film in a direction perpendicular to the direction of magnetic recording are within the ranges of 1 nm$\leq$Ra$\leq$20 nm and Rmax$\leq$25Ra, respectively, the in-plane magnetic anisotropy energy Ku of said magnetic film is within the range of 0$\leq$Ku$\leq$8×10$^5$ erg/cm$^3$, and said magnetic film is made of Co or an alloy containing Co as a principal component.

2. A magnetic recording medium according to claim 1, wherein said average surface roughness Ra and said maximum surface roughness Rmax are within the ranges of 1 nm$\leq$Ra$\leq$20 nm and Rmax$\leq$8Ra, respectively, and said magnetic anisotropy energy Ku is within the range of 0$\leq$Ku$\leq$2×10$^5$ erg/cm$^3$.

3. A magnetic recording medium according to claim 1, wherein said average surface roughness Ra and said maximum surface roughness Rmax are within the range of 1.5 nm$\leq$Ra$\leq$4 nm and 6Ra$\leq$Rmax$\leq$8Ra, respectively, and said magnetic anisotropy energy Ku is within the range of 0$\leq$Ku 2×10$^5$ erg/cm$^3$.

4. A magnetic recording medium according to claim 3, wherein said maximum surface roughness Rmax is within the range of 20 nm<Rmax$\leq$150 nm, and said magnetic anisotropy energy Ku is within the range of 0$\leq$Ku$\leq$2×10$^5$ erg/cm$^3$.

5. A magnetic recording medium according to claim 1, wherein said average surface roughness Ra and said maximum surface roughness Rmax are within the ranges of 1 nm$\leq$Ra$\leq$20 nm and 9Ra$\leq$Rmax$\leq$25Ra, respectively, and said magnetic anisotropy energy Ku is within the range of 0$\leq$Ku$\leq$8×10$^5$ erg/cm$^3$.

6. A magnetic recording medium according to claim 1, wherein said average surface roughness Ra and said maximum surface roughness Rmax are within the range of 4 nm$\leq$Ra 8 nm and 9Ra$\leq$Rmax$\leq$16Ra, respectively, and said magnetic anisotropy energy Ku is within the range of 0$\leq$Ku$\leq$8×10$^5$ erg/cm$^3$.

7. A magnetic recording medium according to any one of claims 1 to 6, wherein said magnetic film is formed from an alloy containing Co as a principal component.

8. A magnetic recording medium according to claim 7, wherein said magnetic film is formed from an alloy containing Co as a principal component, said alloy further containing Ni in an amount of from 20 to 50% by atomic percentage with respect to Co and at least one element selected from Zr and Ti in an amount of from 4 to 15% by atomic percentage with respect to the total amount of Co and Ni.

9. A magnetic recording medium according to claim 7, wherein said magnetic film is formed from an alloy containing Co as a principal component, said alloy further containing Cr in an amount of 20% or less by atomic percentage with respect to Co and at least one element selected from Zr and Ti in an amount of from 4 to 15% by atomic percentage with respect to the total amount of Co and Cr.

10. A magnetic recording medium according to claim 7, wherein said underlayer is defined by a thin film formed from Cr or an alloy containing Cr as a principal component.

11. A magnetic recording medium according to claim 8, wherein said underlayer is defined by a thin film formed from Cr or an alloy containing Cr as a principal component.

12. A magnetic recording medium according to claim 9, wherein said underlayer is defined by a thin film formed from Cr or an alloy containing Cr as a principal component.

13. A magnetic recording medium comprising:
a substrate;
a magnetic film made of Co or an alloy containing Co as a principal component, having excellent crystallizability and no crystallographic orientation provided over said substrate;
the central line average surface roughness Ra and maximum surface roughness Rmax of said magnetic film in a direction perpendicular to the direction of magnetic recording being selected so as to fall within the ranges of 1 nm$\leq$Ra$\leq$20 nm and Rmax$\leq$25Ra, respectively; and
the in-plane magnetic anisotropy energy Ku of said magnetic film being selected so as to fall within the range of 0$\leq$Ku$\leq$8×10$^5$ erg/cm$^3$.

14. A magnetic recording medium comprising:
a substrate;
an underlayer for a magnetic film, said underlayer having a thickness from 50–2,000 nm and being formed from a metal or alloy having a body-centered cubic structure and having no crystallographic orientation;
a magnetic film having excellent crystallizability and no crystallographic orientation, said magnetic film being formed from Co or an alloy containing Co as a principal component;

the central line surface roughness Ra and maximum surface roughness Rmax of said magnetic film in a direction perpendicular to the direction of magnetic recording being selected so as to fall within the ranges of 1 nm$\leq$Ra$\leq$20 nm and Rmax$\leq$25Ra, respectively; and the in-plane magnetic anisotropy energy Ku of said magnetic film being selected so as to fall within the range of 0$\leq$Ku$\leq$8$\times$10$^5$ erg/cm$^3$.

15. A magnetic recording medium according to claim 14, wherein the crystallographic orientation of said magnetic film is so that, when the degree of said orientation is expressed in terms of the diffraction spot intensity ratio of the 0002 diffraction line to the 1$\bar{1}$00 diffraction line in electron beam diffraction by the high-speed electron beam diffraction, said diffraction spot intensity ratio is within the range from 1 to 3.

16. A magnetic recording medium according to claim 14 or 15, wherein said underlayer is formed from Cr or Mo or an alloy containing Cr or Mo as a principal component.

17. A magnetic recording medium according to claim 14 or 15, wherein said underlayer is formed from Cr or an alloy containing Cr as a principal component.

18. A magnetic recording medium according to any one of claims 1 or 14, wherein said alloy containing Co as a principal component is at least one alloy selected from the group consisting of Co—Ni, Co—Cr, Co—Pd, Co—Fe, Co—Fe—Cr, Co—Ni—Cr, Co—Fe—Ni, Co—Ti, and Co—Cu.

19. A process for producing a magnetic recording medium for a magnetic disk which has a magnetic film formed on a substrate from Co or an alloy containing Co as a principal component, said process comprising the steps of:

forming an underlayer for said magnetic film, said underlayer having a thickness from 50–2,000 nm and being formed from a metal or an alloy having a body-centered cubic structure, said underlayer having no crystallographic orientation and said underlayer being formed by a method selected from sputtering, ion beam sputtering, vacuum evaporation and ion plating in such a manner that least one oxidizing gas selected from oxygen, air and water vapor or an inert gas containing said oxidizing gas is introduced into an atmosphere for forming said underlayer;

suspending the supply of said oxidizing gas after the formation of said underlayer; and forming said magnetic film in a predetermined atmosphere.

20. A process for producing a magnetic recording medium according to claim 19, wherein said underlayer forming step is carried out by the sputtering method, an oxidizing gas introduced as a sputtering gas being oxygen or an inert gas containing oxygen, the oxygen concentration in said sputtering gas being set at from 0.05 to 1% by volume.

21. A magnetic recording medium which has a magnetic film formed on a substrate from Co or an alloy containing Co as a principal component formed by the process of claim 19.

22. A magnetic recording medium having a magnetic film formed on a substrate directly, characterized in that the central line average surface roughness Ra and maximum surface roughness Rmax of said magnetic film in a direction perpendicular to the direction of magnetic recording are within the ranges of 1 nm$\leq$Ra$\leq$20 nm and Rmax$\leq$25Ra, respectively, the in-plane magnetic anisotropy energy Ku of said magnetic film is within the range of 0$\leq$Ku$\leq$8$\times$10$^5$ erg/cm$^3$, and said magnetic film is made of Co or an alloy containing Co as a principal component.

23. A magnetic recording medium according to claim 22, wherein said average surface roughness Ra and said maximum surface roughness Rmax are within the ranges of 1 nm$\leq$Ra 20 nm and Rmax$\leq$8Ra, respectively, and said magnetic anisotropy energy Ku is within the range of 0$\leq$Ku$\leq$2$\times$10$^5$ erg/cm$^3$.

24. A magnetic recording medium according to claim 22, wherein said average surface roughness Ra and said maximum surface roughness max are within the range of 1.5 nm$\leq$Ra$\leq$4 nm and 6Ra$\leq$Rmax$\leq$8Ra, respectively and said magnetic anisotropy energy Ku is within the range of 0$\leq$Ku$\leq$2$\times$10$^5$ erg/cm$^3$.

25. A magnetic recording medium according to claim 24, wherein said maximum surface roughness Rmax is within the range of 20 nm$<$Rmax$\leq$150 nm, and said magnetic anisotropy energy Ku is within the range of 0$\leq$Ku$\leq$2$\times$10$^5$ erg/cm$^3$.

26. A magnetic medium according to claim 22, wherein said average surface roughness Ra and said maximum surface roughness Rmax are within the ranges of 1 nm$\leq$Ra 20 nm and 9Ra$\leq$Rmax$\leq$25Ra, respectively, and said magnetic anisotropy energy Ku is within the range of 0$\leq$Ku$\leq$8$\times$10$^5$ erg/cm$^3$.

27. A magnetic recording medium according to claim 22, wherein said average surface roughness Ra and said maximum surface roughness Rmax are within the range of 4 nm$\leq$Ra 8 nm and 9Ra$\leq$Rmax$\leq$16Ra, respectively, and said magnetic anisotropy energy Ku is within the range of 0$\leq$Ku$\leq$8$\times$10$^5$ erg/cm$^3$.

28. A magnetic recording medium according to claim 22, wherein said magnetic film is formed from an alloy containing Co as a principal component.

29. A magnetic recording medium according to claim 28, wherein said magnetic film is formed from an alloy containing Co as a principal component, said alloy further containing Ni in an amount of from 20 to 50% by atomic percentage with respect to Co and at least one element selected from Zr and Ti in an amount of from 4 to 15% by atomic percentage with respect to the total amount of Co and Ni.

30. A magnetic recording medium according to claim 28, wherein said magnetic film is formed from an alloy containing Co as a principal component, said alloy further containing Cr in an amount of 20% or less by atomic percentage with respect to Co and at least one element selected from Zr and Ti in an amount of from 4 to 15% by atomic percentage with respect to the total amount of Co and Cr.

* * * * *